Nov. 6, 1951          R. PROCHAZKA          2,574,284
PROCESS FOR THE PRODUCTION OF HIGH ELECTROSTATIC
CHARGES BY SELF-EXCITATION
Filed March 8, 1949
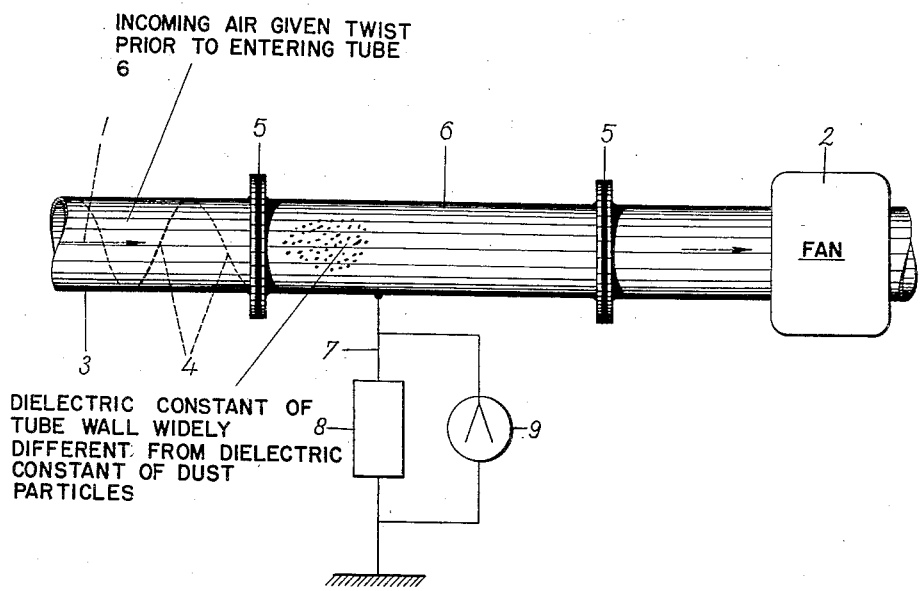
INVENTOR:
RUDOLF PROCHAZKA
By: Hazeltine, Lake + Co.
AGENTS Patented Nov. 6, 1951

2,574,284

UNITED STATES PATENT OFFICE 2,574,284

PROCESS FOR THE PRODUCTION OF HIGH ELECTROSTATIC CHARGES BY SELF-EXCITATION

Rudolf Prochazka, Murzzuschlag, Austria

Application March 8, 1949, Serial No. 80,254
In Austria March 12, 1948

3 Claims. (Cl. 171—328)

In Armstrong's electrifying machine for vapor the steam boiler is charged negatively, the steam flowing out under pressure being charged positively. Recently high tension dust generators with self-excitation—i. e. without spray electrodes or glow electrodes—have been developed, wherein e. g. MgO containing dust laden air is pressed through a nozzle of MgO; at an insulated grid a voltage up to 900 v. is being measured. In another embodiment a current of air laden with silica dust is with a speed of e. g. 3 to 4 m./s. pressed through several copper tubes conductively connected with a hollow ball surrounding said tubes. With this arrangement higher charges are already attained with discharge currents of sizes of $(50 \text{ to } 100) \cdot 10^{-6}$ A.

There are also known arrangements, wherein dust laden air is at a speed surpassing the speed of sound pressed through Laval's nozzles, whereupon it is guided past spray electrodes or glow electrodes, and is thereby charged. The procedure in question is, however, physically quite different from self-excitation.

With the self-excitation the electric charge is namely originating by a frictional electrical effect of the dust particles in consequence of the contact with the inside surface of the tubes flown through.

According to the invention considerably greater and above all sufficiently fluctuation free charges of the dust particles in the gast current, as well as of the wall of the tube may be attained by said self-excitation. For this purpose the gas current entering the tube is given a twist, effecting that a possibly great portion of its dust like disturbed admixtures is by the centrifugal forces acting on said admixtures driven to the inside surface of the tube, and coming into intimate contact with said surface.

The difference—decisive for the charge—of the dielectric constants of the dust particles and of the wall of the tube may, if required, be increased by covering the dust contacted wall of the tube with a substance the dielectric constant of which differs as far as possible from the dielectric constant of the dust.

The accompanying drawing is a diagrammatic showing by way of example of one apparatus for carrying the invention into effect.

As will be apparent from said drawing, the dust laden current of gas or vapor enters the tube 3 in the direction of the arrow 1, the current being sucked in by the action of the fan 2. Within the tube 3 the current is given a twist by the conventional means 4. The tube 3 is connected to the metal tube 6 which is insulated at both ends by the insulating rings 5, the dust particles of the current passing the tube 6 being electrically charged by friction on the inner surface of the tube 6 due to the action of the twist of the current, the tube 6 thus being likewise given an electric charge which is supplied through wire 7 to a consumer 8. For measuring the voltage an electro-meter 9 is provided.

While the invention has been shown in the particular embodiment described it is not limited thereto, as modifications thereof may be made without departing from the scope of the appended claims.

I claim:

1. Apparatus for generating high electrostatic charges by self-excitation comprising a tube, means for causing a stream of gas laden with particles to flow through the tube, and means for imparting a twist to the stream before entering the tube, whereby substantially all of the particles are centrifugally projected into contact with the tube.

2. Apparatus as in claim 1 wherein said first means comprises a suction fan following said tube in the direction of flow.

3. The method of producing high electrostatic charges by self-excitation which comprises causing a stream of gas laden with dust-like particles to flow through a tube the interior surface of which has a dielectric constant differing substantially from that of the particles, and imparting to the stream prior to entering the tube a compound movement having an axial component and a radial outward component, thereby to cause substantially all the particles to be displaced outwardly by centrifugal force into contact with the tube substantially throughout the length thereof.

RUDOLF PROCHAZKA.

REFERENCES CITED

The following references are of record in the file of this patent:

UNITED STATES PATENTS

| Number | Name | Date |
|---|---|---|
| 1,443,091 | Petersen | Jan. 23, 1923 |

OTHER REFERENCES

"A High Voltage Direct Current Generator" by Vollrath Physical Review, vol. 42, Oct. 15, 1932 pages 298–304.